Jan. 6, 1953 R. C. RUSSELL 2,624,324
VALVE GEAR LENGTH COMPENSATION
Filed Sept. 25, 1951
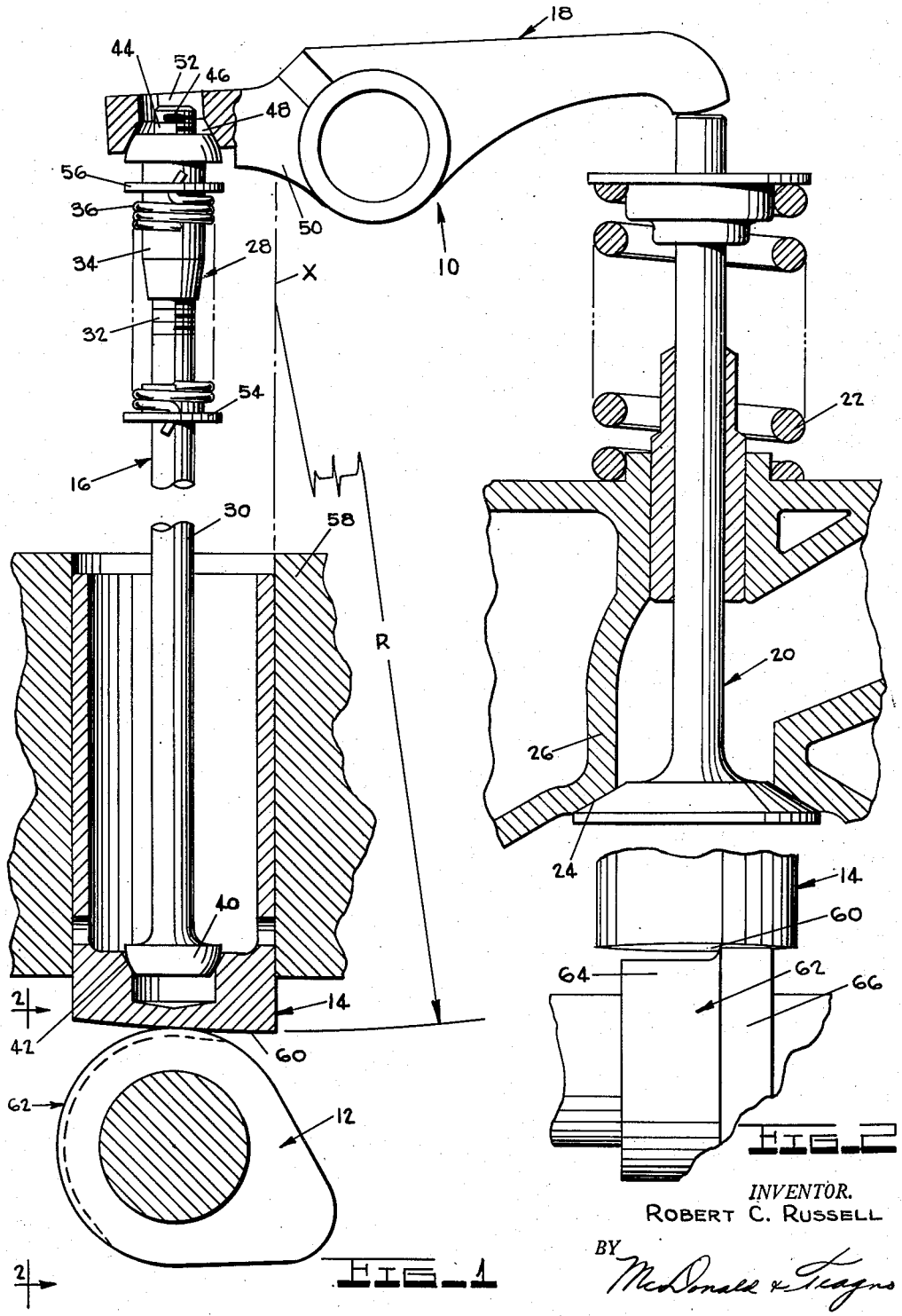
INVENTOR.
ROBERT C. RUSSELL
BY
McDonald & Feagns
ATTORNEYS Patented Jan. 6, 1953

2,624,324

UNITED STATES PATENT OFFICE 2,624,324

VALVE GEAR LENGTH COMPENSATION

Robert C. Russell, Euclid, Ohio, assignor to Eaton Manufacturing Company, Cleveland, Ohio, a corporation of Ohio Application September 25, 1951, Serial No. 248,135

13 Claims. (Cl. 123—90)

This invention relates to valve operating mechanism for internal combustion engines and more particularly to means for automatically compensating for variations in length of the operating components of said mechanism and constitutes a continuation-in-part of my co-pending application Serial No. 212,543.

Broadly the invention comprehends the provision of means in the form of a torsion spring loaded screw and nut assembly incorporated in the component members of a valve operating mechanism and wherein through a prescribed turning of one member of the screw and nut assembly relative to the other member thereof a shortening or elongating compensation for the valve operating mechanism is attained. The turning of the members relative to one another as herein accomplished through the engagement of an angular curved surface on a member, associated with either the screw or nut member, with a cam having a recess in a portion of its engaging surface.

Among the several objects of the invention are the following:

To provide mechanical means for automatically compensating for variations in length of the operating components of a valve operating mechanism that is simple and practical of construction, economical to manufacture and effective in operation; that assures an automatic length compensation under all normal conditions of operation such as relates to speed, wear, temperature, contamination, expansion and contraction and etc.; that effects an automatic length compensation upon the base circle portion of the cam of the valve operating mechanism; that only operates to effect a length compensation when required; that compensates for any eccentricities in the base circle portion of the cam; that includes the basic elements of a screw and nut assembly normally biased apart by a torsion spring; that has a turning movement imparted to one of the members of the screw and nut assembly thereof when a length shortening compensation of the valve operating mechanism is required by way of the interengaging friction surfaces of the tappet and cam of said mechanism; that is not subject to excessive wear thus permitting of an extended, service-free life thereof; that insures against edge loading upon the tappet component of the mechanism through engagement with the cam component of the mechanism; and that permits of the easy and simple incorporation thereof as a suitable part of any component member employed in the valve operating mechanism such as tappet, pushrod, rocker arm and etc.

Other objects and advantages of the invention will appear from the following description taken in connection with the drawings forming a part of the specification, and in which:

Fig. 1 is a partially elevational, partially cross-sectional view of a valve operating mechanism incorporating automatic length compensation means therein; and Fig. 2 is a fragmentary end view taken substantially along lines 2—2 of Fig. 1.

Similar reference characters indicate corresponding parts throughout the two views of the drawings.

This means for automatically mechanically compensating for any expansion, contraction and wear in the operating length of valve operating mechanism for internal combustion engines and the like was devised primarily for the purpose of providing a simple, practical and economical way of overcoming the failings of the majority of previously devised structures for the same purpose.

Referring to the drawings for more specific details of the invention 10 represents generally a valve operating mechanism for an internal combustion engine comprising as component members thereof a cam 12, a tappet 14, a pushrod assembly 16, a rocker arm 18 and a valve 20.

As will be noted in viewing Fig. 1, the valve operating mechanism is shown virtually at rest wherein the cam has moved to its base circle and the valve has been actuated by valve spring 22 to closed position on its seat 24 in engine block 26.

An automatic length compensating device 28 for the valve operating mechanism is incorporated in pushrod assembly 16, the purpose and operation of which will hereinafter be stated.

The pushrod assembly 16 includes a preferably slender screw element 30 having a screw threaded portion 32 at one end thereof, a nut element 34 threadingly engageable upon the screw threaded portion of element 30 and a torsion spring 36 interconnected between the nut and screw elements normally biasing them apart from one another.

The screw element 30 includes in addition to the screw threaded portion, an opposite axially extended portion 38 terminating at its extremity 40 opposite axially disposed from the threaded portion in a partially spherical shape. The spherical end 40 of the screw element is received in annular line biasing relation in a conical shaped socket 42 formed internally of the tappet 14 near the closed end thereof.

The nut element 34 in being threaded upon the screw element is normally positioned within the axial confines of the screw element such that a part of said threaded portion of the screw element protrudes axially outwardly beyond the outer end 44 of the nut element. A thread obstruction 46 is provided near the extremity of the threaded portion of the screw element serving to inhibit movement of the nut element off of the screw element and thus establishing the maximum extent to which adjustment for lengthening of the pushrod can be made.

A spherical surface is provided upon outer end 44 of the nut adapted to have annular line bearing engagement with a conical shaped socket 48 formed as part of one arm 50 of rocker arm 18. With the threaded portion of screw element 30 extending axially beyond the nut element 34 and with the spherical end 44 of the nut element in bearing relation in socket 48 of the rocker arm, the threaded portion is received in an aperture 52 in the rocker arm concentric with the socket.

The torsion spring 36 is arranged in telescoping relation to the nut and screw elements under load with its opposite extremities secured respectively upon a collar 54 of the screw element and a collar 56 of the nut element tending to bias the screw and nut elements apart from one another. The pre-load of the spring is to be of an amount sufficient to permit of elongation of the pushrod to the extent of adjustment permitted.

The screw and nut elements are threaded righthanded as shown by Fig. 1 and preferably are to be of as steep an angle as possible just so long as they are self-locking. This steep thread angle is used to get a broad differential between the effort required to shorten the screw and the effort required to lengthen the screw. In so being self-locking it is not possible to cause a threading up of the nut and screw elements due to any amount of axial load. Self-locking as herein defined has reference to the friction applied at the ends of the screw and nut assembly particularly in behalf of the friction connections disclosed herein in Fig. 1.

Tappet 14 is supported for reciprocation in the tappet guide 58 and as such is free to oscillate without interference.

An inclined curved cam engaging surface 60 is provided on one end of the tappet axially oppositely disposed from socket end 42 thereof. The angle of the curved surface of the cam end of the tappet should substantially exceed the maximum anticipated manufacturing misalignment from the customary 90° relation of the axis of the tappet and the cam and thereby insure against oscillation or rotation of the tappet during an opening and closing of the cycle of the valve. This same angle will cause the tappet to caster into line contact with the cam face.

The inclined curved surface of the tappet is engageable by the cam with the median line of the main contacting surface of the cam preferably arranged in intercepting relation to the axis of the tappet.

The radius R of the inclined curved surface 60 has its axis along the plane of line X extended such that looking at Fig. 1 it is to be noted that the tappet has a greater height on one side than on the side opposite thereto.

In so providing the surface thereof of true radius, it constitutes a true cylindrical surface.

The cam is provided across the major portion of its base circle 62 with a relief 64 such as to present a flange 66 offset one side of the median line of the main contacting surface of the cam such that the flange is engageable with the tappet effective to cause turning thereof if a load is existent between the engageable surfaces of the cam and tappet on the base circle. This turning which is imparted by flange 66 to the tappet is readily apparent since the flange contacts the tappet at a given radius arm from the axis of the tappet which exerts a sufficient torque to turn it against the resistance imposed thereon.

In a normal operation of the valve operating mechanism of Fig. 1 assuming that as shown the component valve 20, rocker arm 18, pushrod 16, tappet 14, and cam 12 are in perfect engaged relation to one another, that is with zero clearance throughout and with no other load than that of the torque spring, a rotation of the cam in a clockwise direction from the position shown all the way across the base circle of the cam to the beginning of the ramp of the cam will not cause the actuation of any other component member of the valve operating mechanism. This non-actuation of the members of the valve operating mechanism aside from the cam is only possible during this phase of operation of the cam if no eccentricity is present in the base circle of the cam. Otherwise if there is eccentricity, any portion of the base circle undersize will be immediately compensated for by the action of pre-loaded torsion spring 36 operating to maintain zero clearance by its act of elongating the pushrod through relative movement of the screw element to the nut element.

On the other hand if the eccentricity is an amount oversize to the base circle a tendency to lifting the valve off its seat would be present thus imposing a load between the tappet and cam surfaces of an amount whereby the flange 66 in engagement upon the tappet surface 60 will cause a turning of the tappet which turning by way of frictional engagement of spherical surface 40 on the pushrod with the surface of socket 42 in the tappet will effect a turning of the screw element into the nut element for a shortening operation of the pushrod. This screwing up of the screw and nut elements or shortening of the pushrod as it may be termed will continue so long as the amount of excess eccentricity requires and until the load acting upon the component members is removed. By so shortening the pushrod which occurs almost instantaneously with the encountering of the plus eccentricity the valve is prevented from being moved off its seat, thus maintaining the required closed condition thereof other than on the desired opening and closing operating cycle thereof.

The friction provided between the end 40 of the screw element of the pushrod and the socket 42 of the tappet need be of an amount sufficient to provide for the coupled turning of the tappet and the screw element in a clockwise direction to overcome the combined turning resistance offered by the threads of the screw and nut elements in a threading together thereof and the pre-load of torsion spring 36 while at the same time permitting of the relative movement of the tappet to the screw element in a counter-clockwise direction against the resistance offered by the threads in attempting to thread them apart when a load is imposed thereon. It is to be understood that this friction provided between the screw element and tappet as relates to the nut and screw elements assembly as above defined is effected by a load imposed on the component members of the valve operating mechanism such as by the valve spring 22.

The friction between the spherical end 44 of the nut element and the socket 48 of the rocker arm is to be of an amount sufficient to resist the turning resistance between the threads of the screw and nut elements as regards the action of the screw element threading into the nut element for a shortening operation of the pushrod.

The necessity for relative turning movement between the tappet and screw element is obvious because upon the turning of the tappet by the cam to cause a relative turning between the screw and nut elements the correction for misalignment which the tappet's inclined curved surface 60 makes with the cam has to be restored immediately to line contact so that no undue wear will occur between the cam and tappet surfaces because of misalignment.

The friction engagement had between the spherical end of the nut element and the socket of the rocker arm and between the spherical end of the screw element and the socket of the tappet is purposely made of an annular line bearing nature so as to prevent oil film formation between these surfaces which would ordinarily tend to destroy an established friction relation therebetween especially since the continued maintenance of a substantially predetermined friction is essential to proper operation of the adjusting device and the valve operating mechanism.

As the cam is further rotated, from the point where the base circle merges into the ramp, until where the ramp merges with the base circle on substantially the diametrically opposite side of the cam, an opening or lifting and a closing cycle of operation of the valve occurs. During this cycle of operation with the valve spring 22 offering resistance to movement of the valve a linear load is imposed upon the component members of the valve operating mechanism such that zero clearance engagement is had between the valve and an arm of the rocker arm, the arm 50 of the rocker arm and the nut element, the nut element in turn transmitting its linear motion to the screw element without normal relative movement therebetween, the screw element engaging the tappet and the tappet engaging the cam. With this condition of engagement existing between the members of the valve operating mechanism and with the surface on the ramp of the cam engaging the tappet centrally thereof no turning movement is imparted to the tappet and consequently no false adjustment can take place.

Immediately with the cam returning to its base circle portion the valve spring load is removed from the valve operating mechanism if no expansion has occurred in the length of the mechanism tending to hold the valve off its seat. If expansion has occurred during the previous opening and closing cycle of the valve causing the valve spring load to bear lineally on the component members of the mechanism, a load will be borne between the tappet and cam surfaces such that as the cam flange 66 bears against the tappet surface 60 a turning of the tappet will occur, said turning thereof to be transmitted by way of the friction connection between the tappet and screw element to turn the screw clockwise. Simultaneously with the screw element being turned the nut element by way of its friction connection with the rocker arm is held against turning inasmuch as the resistance to turning thereof is greater than the resistance of the thread and the pre-load of spring 36 permitting of relative turning between the screw and nut elements, whereby the pushrod is shortened. This shortening will take place only so long as the valve is held open and the valve spring load remains imposed on the valve operating mechanism whereupon with its release and substantially no load being imposed between the tappet and cam, the flange will cease to be able to rotate the tappet and thus will only have surface sliding relation with regards to the cam. With length adjustment having been made to account for expansion in the mechanism the tappet will be turned reversely so that alignment can once again be restored between the cam and tappet. This reverse movement of the tappet is possible without effecting any substantial linear movement being imparted inasmuch as the friction connection between the tappet and screw element and between the nut element and rocker arm are purposely made of an amount to permit of slipping therebetween when a counter-clockwise turning movement is imposed upon the screw element tending to cause a threading apart of the screw and nut element or lengthening of the pushrod. As noted the nut-rocker arm friction and the screw-tappet friction are the same so that slippage during recovery of the tappet can occur at either end of the pushrod without any effect on the nut and screw relationship.

Should contraction or wear occur in the valve operating mechanism during the opening and closing operation of the valve, the torsion spring 36 will immediately function to compensate therefor as the cam returns to its base circle position in relation to the tappet thus preventing the introduction of clearance in the mechanism by elongating the pushrod through the relative motion of unthreading the screw and nut elements from one another. This movement immediately brings about engagement once again of all the component members of the valve operating mechanism.

Thread obstruction 46 in addition to maintaining the screw and nut elements in coupled assembly prior to installation and use in a valve operating mechanism also insures against over adjustment which might otherwise occur if the valve was caused to be stuck open and thereby prevents any serious damage to the engine block.

Through the use of the inclined curved surface 60 on tappet 14 an assured alignment is had between the engaging surfaces of the cam and tappet effective to correct for misalignment, wherein the axis of the tappet and camshaft are not arranged substantially perfectly normal to one another. Aside from providing desired alignment between the tappet and cam surfaces the inclination prevents turning of the tappet for all rotation of the cam but when turning of the tappet is required to shorten the pushrod for length adjustment of the valve operating mechanism. Because of the curvature of the surface 60 of the tappet in the plane of the inclination a distinct advantage is presented over the structure of co-pending application Serial No. 212,543 in that should the cam engaging surface such as shown by Fig. 2 be of a width less than the diameter of the tappet engaging surface edge bearing, gouging or scuffing is eliminated. This is possible since with the curved surface 60 of the tappet the cam only bears in line engagement thereacross and cannot have its end axial surface portions dig into the tappet surface over a flat surface as it might otherwise do. This ensures of a prolonged life of the tappet through a material reduction in scuffing or wear of the cam engaging surface 60 thereof.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A valve operating mechanism comprising threadingly engaged screw and nut members, a spring normally biasing the members apart, a rotatable cam including a ramp portion and a base circle portion, said base circle portion presenting a peripheral flange of narrower width than the remaining contact engaging surface of the cam offset to one side of a plane passing through the median of the remaining contact engaging surface of the cam, and reciprocable and rotatable means, reciprocable along an axis substantially at right angle to the axis of rotation of the cam, frictionally connected to one of the threadingly engaged screw and nut members having a cam contacting surface engageable with the surface of the cam with the axis of the means offset to one side of the flange of the cam, said cam contacting surface on the means being angularly offset a small amount to a plane normal to the axis of the means and curved in the direction of the angularity, said angularity being equal to or greater than the angular variation from true right angular relation between the axes of the means and cam.

2. A valve operating mechanism according to claim 1 wherein the means constitutes a tappet.

3. A valve operating mechanism according to claim 2 wherein the screw and nut members constitute a pushrod, one member of which has frictional engagement with the extremity of the tappet opposite from its cam engaging surface and the other member of which has frictional engagement with an arm of a rocker arm forming part of the valve operating mechanism.

4. A valve operating mechanism according to claim 3 wherein the frictional resistance to threading up of the members is less than frictional resistance to turning between the members and the respective rocker arm and tappet and wherein the frictional resistance to turning between the tappet and member engageable therewith is less than the resistance to threading apart of the members when under axial compressive load.

5. A valve operating mechanism according to claim 3 wherein annular line bearing engagement is had between the screw and nut members and whichever one of either the tappet and rocker arm respectively that they are engageable with.

6. A valve operating mechanism according to claim 1 wherein the screw member is frictionally connected to the means.

7. A valve operating mechanism according to claim 1 wherein the nut member is frictionally connected to the means.

8. A valve operating mechanism according to claim 1 wherein the spring has its opposite ends connected to the respective screw and nut members.

9. A valve operating mechanism according to claim 1 wherein the cam contacting surface is cylindrical.

10. A valve operating mechanism comprising threadingly engaged screw and nut members, a spring normally biasing the members apart, a rotatable cam including a ramp portion and a base circle portion, said base circle portion presenting a peripheral flange of narrower width than the remaining contact engaging surface of the cam offset to one side of a plane passing through the median of the remaining contact engaging surface of the cam, and means engageable with one of the threadingly engaged screw and nut members having a cam contacting surface engageable with the surface of the cam with the axis of the means offset to one side of the flange of the cam, said cam contacting surface being cylindrical with its axis lying perpendicular to the axis of the means and offset a predetermined amount to one side of the axis of the means.

11. A tappet, forming a part of a valve operating mechanism of the character described, adapted for reciprocation substantially along its axis, having a cam contacting surface on one end thereof angularly offset a small amount to a plane normal to the axis of the tappet and curved in the direction of the angularity.

12. A tappet according to claim 11 wherein the cam contacting surface is cylindrical.

13. A tappet, forming a part of a valve operating mechanism of the character described adapted for reciprocation substantially along its axis, having a cylindrical cam contacting surface with its axis lying perpendicular to the axis of the tappet and offset a predetermined amount to one side of the axis of the tappet.

ROBERT C. RUSSELL.

REFERENCES CITED

The following references are of record in the file of this patent:

UNITED STATES PATENTS

| Number | Name | Date |
|---|---|---|
| 1,820,891 | Spiller | Aug. 25, 1931 |
| 1,903,078 | Woolman | Mar. 28, 1933 |
| 1,907,631 | Warren | May 9, 1933 |
| 2,418,110 | Burkhardt | Apr. 1, 1947 |